United States Patent
Rizzardi

(10) Patent No.: US 6,244,603 B1
(45) Date of Patent: Jun. 12, 2001

(54) HAND TRUCK FOR TRANSPORTING LAND-AND WATER-CRAFT

(76) Inventor: James W. Rizzardi, P.O. Box 16, Mackinaw City, MI (US) 49701-0016

( * ) Notice: Subject to any disclaimer, the term of this patent is extended or adjusted under 35 U.S.C. 154(b) by 0 days.

(21) Appl. No.: 09/304,122

(22) Filed: May 3, 1999

Related U.S. Application Data

(60) Provisional application No. 60/085,406, filed on May 14, 1998.

(51) Int. Cl.[7] .................... B62B 1/14; B62B 1/06; B60P 3/10
(52) U.S. Cl. .................. 280/47.331; 280/414.1; 280/47.17; 114/344; 414/444
(58) Field of Search .................. 114/344; 280/414.1, 280/47.331, 47.131, 47.17, 47.18, 47.19, 47.24, 63, 414.2, 47.23; 414/444, 460

(56) References Cited

U.S. PATENT DOCUMENTS

| | | | |
|---|---|---|---|
| 4,392,665 | * 7/1983 | Miller et al. | 114/344 |
| 4,422,665 | * 12/1983 | Hinnant | 114/344 |
| 4,544,172 | * 10/1985 | Poulouin | 114/344 |
| 4,603,872 | * 8/1986 | White | 114/344 |
| 4,685,854 | * 8/1987 | Bulle | 414/452 |
| 5,000,468 | * 3/1991 | Weinstein | 114/344 |
| 5,005,846 | * 4/1991 | Taylor | 114/344 |
| 5,267,746 | * 12/1993 | Steveson | 114/344 |
| 5,513,939 | * 5/1996 | Martin et al. | 414/447 |
| 5,709,397 | * 1/1998 | Hall | 414/490 |
| 5,823,551 | * 10/1998 | Conroy | 280/47.131 |
| 6,071,061 | * 6/2000 | Monnin | 414/457 |

* cited by examiner

Primary Examiner—Lanna Mai
Assistant Examiner—Jeff Restifo
(74) Attorney, Agent, or Firm—George L. Boller

(57) ABSTRACT

A hand truck for transporting a craft such as a jet ski, snowmobile, or sailboat has a frame that is open at one lengthwise end, having lengthwise extending sides for placement alongside a craft that is to be transported. Wheels on the sides of the frame proximate the open end of the frame provide for the frame to be rolled on an underlying surface and for the frame to pivot relative to the wheels. Lift bars extend from the sides of the frame proximate the open end of the frame, including lifters for engaging a craft, to support the craft on the frame. A handle is at a lengthwise end of the frame opposite the open end of the frame. The lift bars and lifters are constructed and arranged to provide a mechanical advantage for lifting the craft when the handle is forced in a generally downward direction to pivot the frame about the wheels. Various embodiments of lifters are disclosed.

15 Claims, 5 Drawing Sheets

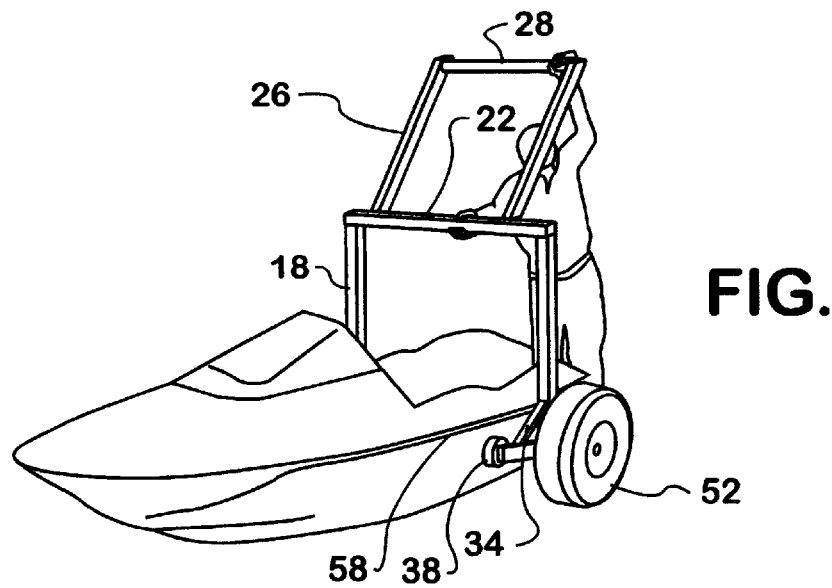
FIG. 3
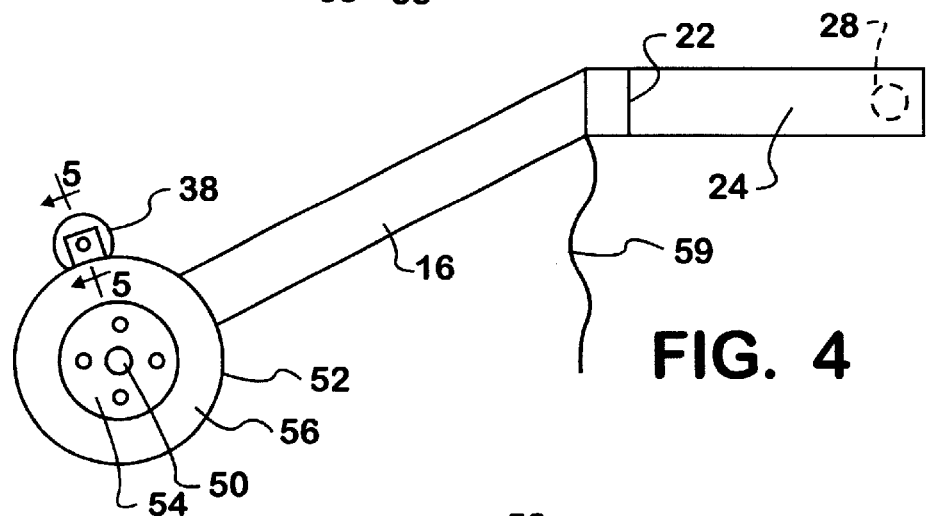
FIG. 4
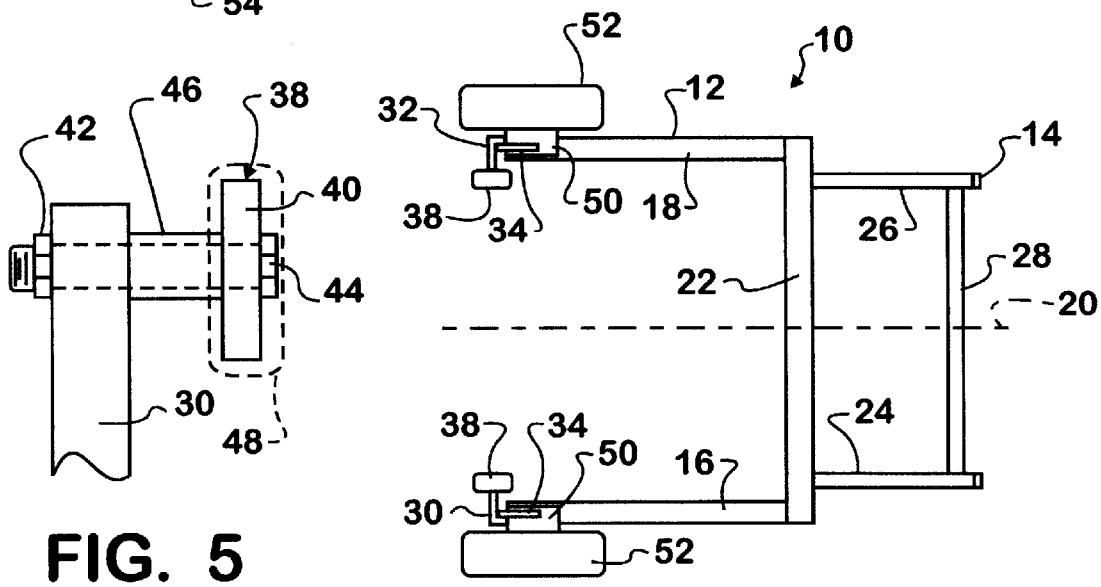
FIG. 5
FIG. 6

HAND TRUCK FOR TRANSPORTING LAND-AND WATER-CRAFT

REFERENCE TO RELATED APPLICATION AND PRIORITY CLAIM

This application expressly claims the benefit of earlier filing date and right of priority from the inventor's U.S. Provisional Patent Application Ser. No. 60/085,406 filed on May 14, 1998 and bearing the same title. The entirety of that earlier-filed, co-pending patent application is hereby expressly incorporated herein by reference.

FIELD OF THE INVENTION

This invention relates to a truck for transporting land- and water-craft, such as a jet ski, snowmobile, or sailboat. More particularly it relates to a wheeled truck that can be rolled by hand over various types of surfaces to transport a craft from place to place.

BACKGROUND OF THE INVENTION

U.S. Pat. Nos. 2,844,383; 3,917,083; 4,392,665; 4,544,172; and 4,603,872 disclose different hand-operated, wheeled transporters for moving water-craft, such as boats, sailboards, and jet skis over various types of surfaces. Of these only U.S. Pat. No. 4,603,872 appears to relate specifically to transporting a jet ski. The jet ski dolly disclosed in that patent comprises a frame having a bow that engages the bow of the jet ski. The frame bow is supported by a single wheel beneath it. In order for the bow of the frame to engage the bow of the jet ski, the frame must apparently be placed forward of the jet ski's bow, and the jet ski's bow must be raised while the dolly is rolled rearward. Once the frame's bow is gripping the jet ski's bow, the rear ends of handles that extend rearward along and beyond the sides of the jet ski can be grasped and lifted, thereby lifting the jet ski for transport in the manner of a wheelbarrow. Needless to say, such a procedure requires the exertion of a substantial amount of human effort, both to ready the jet ski for transport, and then to transport it.

SUMMARY OF THE INVENTION

One aspect of the present invention relates to a hand truck that is significantly more convenient for an individual to use. Use of a hand truck that embodies principles of the present invention does not require any preliminary lifting of the craft that is to be transported in order to associate the truck with the craft. Moreover, once the inventive truck has been associated with the craft, less human effort is required in order to elevate the craft from an underlying surface. Still further, much less effort has to be exerted in order to maintain the craft elevated during transport.

A truck that embodies principles of the present invention can be economically fabricated because of its use of a metal frame that can be manufactured by conventional metal fabrication methods, and its use of wheels, tires, and hubs that are commercially mass-produced.

The inventive truck possesses features that make it especially useful for various purposes, not only for transporting a jet ski, snowmobile, or sailboat, but for transporting other items as well.

The foregoing, and other features, along with various advantages and benefits of the invention, will be seen in the ensuing description and claims which are accompanied by drawings. The drawings, which are incorporated herein and constitute part of this specification, disclose a preferred embodiment of the invention according to the best mode contemplated at this time for carrying out the invention.

BRIEF DESCRIPTION OF THE DRAWINGS

FIG. 3 is a perspective view from the right rear showing how the truck is associated with the jet ski preparatory to transport.

FIG. 4 is a right side elevation view.

FIG. 5 is a transverse cross section view in the direction of arrows 5—5 in FIG. 4.

FIG. 6 is a top plan view of FIG. 4.

DESCRIPTION OF THE PREFERRED EMBODIMENT

Figure 1:
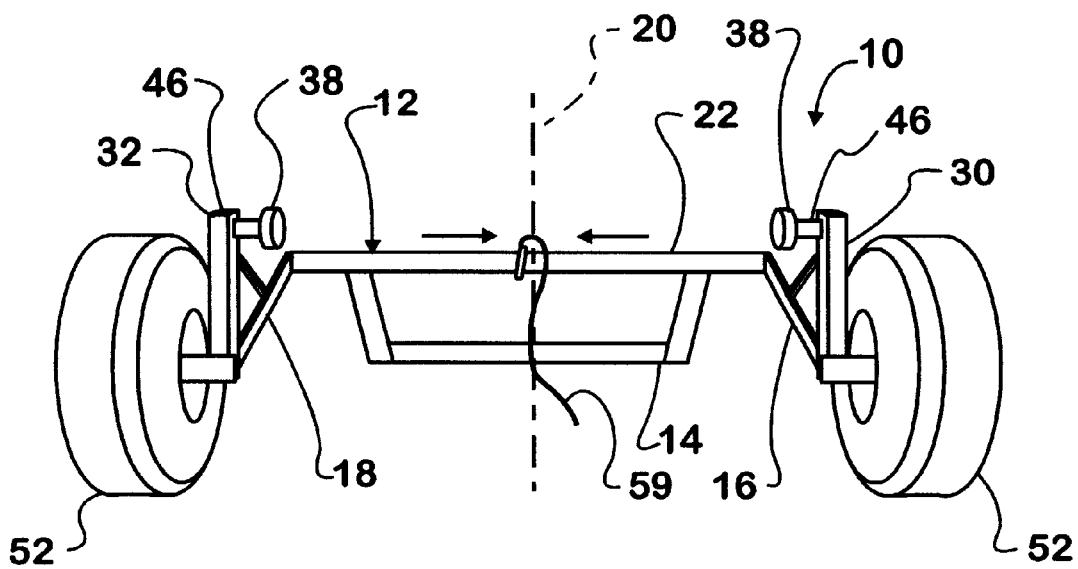
FIG. 1 is a perspective view of an embodiment of the inventive truck by itself looking from the rear.

The drawings show a truck 10 that embodies principles of the invention. Briefly, truck 10 comprises a metal frame 12 that includes an integral handle 14. The main portion of frame 12 comprises two side rails 16, 18 that are parallel with each other and spaced to be either side of an imaginary vertical medial plane 20. Rails 16, 18 are of equal lengths and joined at their forward ends by a cross rail 22. Handle 14 comprises two sides 24, 26 that are joined at their rear ends with cross rail 22 at locations that are set inward from side rails 16, 18. From cross rail 22, sides 24, 26 extend forward, parallel with each other, to either side of plane 20. Handle 14 further comprises a hand grip bar 28 that connects the forward ends of sides 24, 26. Sides 24, 26 are non-parallel with side rails 16, 18, making an obtuse angle of about 140 degrees with side rails 16, 18.

Proximate the rear end of each side rail 16, 18 is a respective lift bar 30, 32. Lift bars 30, 32 are of equal lengths and parallel with each other. Each lift bar is non-parallel with its respective side rail 16, 18. In truck 10, each lift bar is essentially at a right angle to its respective side rail, and its length is noticeably less than that of the respective side rail.

One end of each lift bar is joined with the respective side rail. This joining of each lift bar to its side rail may be rigidified by a short diagonal brace 34. Attached to the end of each lift bar opposite its attachment to its side rail is a respective lifter 38. Each lifter comprises a circular metal disk having a hole through its center. The attachment of each lifter 38 to its lift bar comprises a fastening system that includes a nut 42, a bolt 44, and a spacer sleeve 46. A large part of each disk 40 is enclosed within a protective pad 48 that fits over and around the outer rim of the disk.

The shank of a bolt 44 passes through the hole in the center of a disk 40. A spacer sleeve 46 is fitted over the bolt shank between the part 40 and the lifter 38. The lifter has a hole through which the bolt shank passes. A nut 42 is threaded onto the end of the shank that protrudes from lift bar 38 opposite spacer sleeve 46. When the nut is tightened, it and the screw head draw part 40, sleeve 46, and lifter 38 tightly together.

The rear end of each side rail also serves to mount a respective wheel hub 50 that in turn serves to mount a respective wheel assembly 52 to the outside of each side rail. A wheel assembly 52 comprises a metal wheel 54 whose rim contains a rubber tire 56. Wheel assembly 50 is commercially available. Wheel 54 and hub 50 have a four-hole pattern for fastening the wheel to the hub. It is desirable that tire 56 have a diameter and width large enough to provide convenient transport over various types of services ranging from fairly smooth and level showroom floors to highway and off-road surfaces, including sandy beaches. A suitable tire size is 22"×11"×8", a size often used in four-wheel ATV's.

It is to be noticed that frame 12 is constructed to comprise an open throat at its rear. This allows the frame to be associated with a jet ski without the jet ski having to be lifted. With a jet ski on the ground as in FIG. 3, the rear end of truck 10 can be positioned in alignment with the stern of the jet ski. Handle 14 is operated to a generally upright orientation as shown so as to position disks 40 beneath an overhang 58 that extends fore and aft along the sides of the jet ski, and the truck is rolled toward the bow of the jet ski. Notice how the craft passes through the open throat of the frame as the truck is rolled toward the jet ski's bow. When tires 56 are about halfway along the length of the jet ski, hand grip bar 28 is pulled downward to pivot the entire frame about the common axis of the wheels such that disks 40 swing in an upward arc to engage in the underside of overhang 58. Pad 48 provides an intervening cushion between the disks and the jet ski that prevents the disks from otherwise potentially marring the craft.

Once disks 40 engage overhang 58, continued downward motion of hand grip bar 28 lifts the craft off the underlying surface. From the initial action of the lifters with the craft, a person can tell whether the craft is in a state of substantial fore and aft balance. If there is an undesirable imbalance, the craft can be lowered, the truck re-positioned, and hand grip bar 28 again pulled down. This process can be repeated until a desired state of fore and aft balance is attained. It is believed desirable for the craft to be supported by the truck at a location that is slightly forward of that the craft's center of gravity. This allows a tether strap, or cord, 59 to be positioned between the stern of the craft and the frame in the vicinity of cross rail 22, as shown, to provide two-point fore and aft support for the craft during transport. When supported in this way, the craft imposes a certain downward force on the handle that must be countered by a person who moves the truck via handle 14, but by suitable placement of the truck relative to the jet ski, that force should not be excessively large.

It is to be noticed that when handle 14 is pulled down by a person to elevate the jet ski for transport, the truck act as a first class lever having a fulcrum at the common axis through the wheels. This provides a significant mechanical advantage, making the force required to elevate the jet ski significantly less than the weight of the jet ski. As with any equipment, reasonable care must always be exercised by a person using it. By keeping the tensioned tether strap attached until the craft is to be unloaded, the craft and truck act as one about the common axis of the wheels. The truck must also not be overloaded.

Frame 12 can be fabricated by conventional methods. Its parts can be square tube stock of suitable size for the particular load to be transported. For example, 2"×2" steel tubing is believed suitable for many uses. It is desirable that cross rail 22 be welded to side rails 16, 18 so that these three components form a unit that cannot be disassembled. Likewise for handle 14. While handle 14 can be welded to cross rail 22, it may be desirable for the handle to be a separate assembly that can be attached and adjusted to the body of the frame. This allows more compact packaging to be used for shipping a new truck to a customer. For shipping, the handle may be nested within the body of the frame, and the other parts like the wheel assemblies and hubs may be nested within both.

It is also contemplated that the inventive truck may have a handle different from the one shown in the drawings. For instance, a T-shaped handle may replace the U- or C-shaped one shown in the drawings. A drawbar may be used to couple the truck to a vehicle that can pull or push the truck.

Typically, a particular model of the inventive truck will be designed for certain sizes of craft to be moved, and while a given a model may be used with different crafts, a truck can include a useful adjustment feature for accommodating even more crafts. That feature comprises a lateral adjustment for disks 40. Such a lateral adjustment can be accomplished by using different length spacer sleeves. The longer the sleeves, the closer the two disks for fitting to a narrower craft. The shorter the sleeves, the farther apart the two disks for fitting a wider craft. A bolt 44 has a length for handling different length sleeves. In order to have access to such adjustments, a lift bar must protrude sufficiently beyond the adjacent tire, as can be seen in FIG. 3. An advantage of such an adjustment is that it is apt to be inherently self-compensating for different length sleeves. While a longer sleeve may ostensibly impose a larger bending moment on the lift bar and its mounting on the frame, it is likely that the narrower craft will be lighter thereby reducing the load that must be lifted by each lift bar. Hence the bending moment there is actually imposed may not change significantly.

Other means of adjustment may also be provided. For example, the overall width of the truck may be made adjustable by dividing the frame into two halves that telescopically fit together. The telescoping joints may have manually operable fasteners, such as thumbscrews, wingscrews, or wingnuts.

Figure 7:
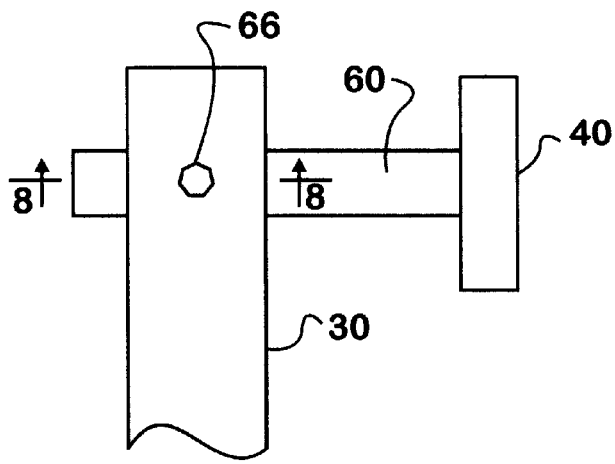
FIG. 7 is a view similar to FIG. 5 showing a modified form.
Figure 8:
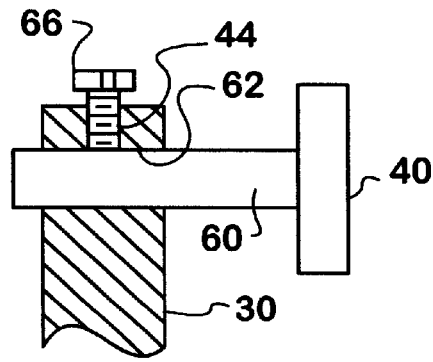
FIG. 8 is a view partly in cross section in the direction of arrows 8—8 in FIG. 7.

FIGS. 7 and 8 show a different arrangement for adjusting disks 40 on the frame. Each disk is at one end of a shaft 60. Each lift bar 30 has a hole 62 through which the corresponding shaft 60 passes with a close sliding fit. A threaded hole 64 intersects each hole 62 as shown. The shank of a threaded fastener 66 is threaded into each hole 64. The head of the fastener can be rotated by hand or a tool, depending on the design of the head, for tightening the end of the shank against the side of shaft 60. When the fastener is untightened, the shaft can be slid to a desired position of adjustment along hole 62 and then retightened, The head end of the fastener may be a hex head that can be turned by a wrench, or else a thumb screw that is turned by hand. Each hole 62 is located such that tire 56 will not interfere with the positioning of shaft 60.

Figure 10:
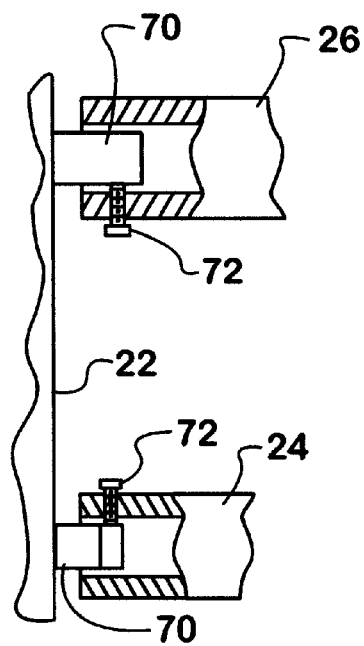
FIG. 10 is a fragmentary view of a portion of FIG. 9 with portions in cross section.
Figure 9:
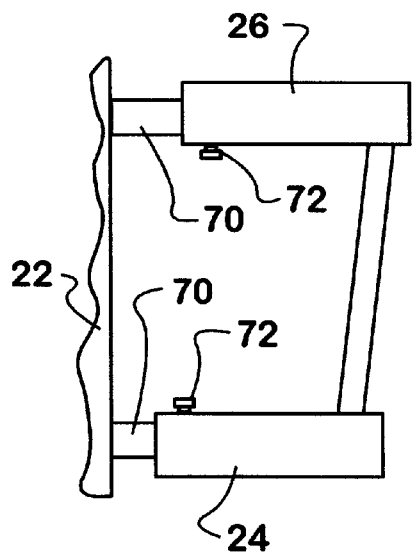
FIG. 9 is a view similar to the right hand portion of FIG. 6 showing a modified form.

FIGS. 9 and 10 show a separable attachment of handle 14 to the frame. Two short posts 70 project from cross rail 22. The ends of the handle's sides 24, 26 are rectangular tubes that telescope over the posts. A fastener 72 is threaded into a hole in each side, and when it is tightened, the end of its shank abuts the post 70 to lock the handle side to the post. Depending on design, the head of fastener 72 can be turned by either a tool, or by hand.

Figure 11:
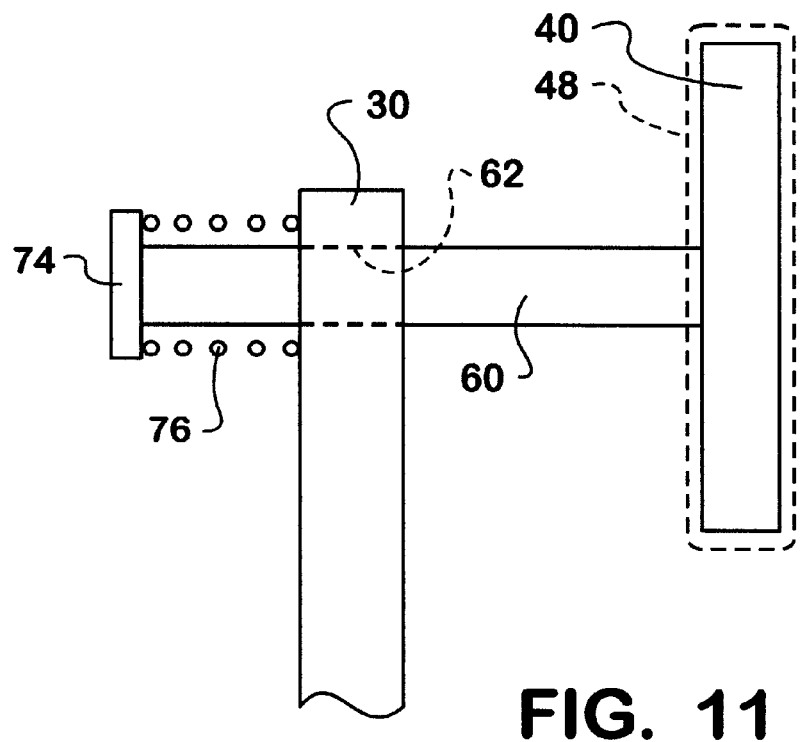
FIG. 11 is a view similar to FIG. 5 showing another modified form.

FIG. 11 shows a self-positioning disk 40. A collar 74 is fastened to shaft 60 at the opposite end from disk 40. An extension spring 76 is disposed around the portion of shaft 60 between collar 74 and lift bar 30. One end of the spring is anchored to the lift bar and the other end is anchored to the collar. When the spring is relaxed, disk 40 assumes the position shown. If the disk is displaced toward the lift bar, shaft 60 slides through hole 62, moving collar 74 farther away from the lift bar. That will begin stretching spring 76. Disk 40 is self-positioning because as it is moved to engage a craft that is to be transported, the interference between the two will cause the disk to move outward to accommodate whatever width the craft has. When the craft has been transported and the disk is moved, spring 76 relaxes, returning the disk to the initial position. This self-positioning feature may be used for one or both disks.

Figure 12:
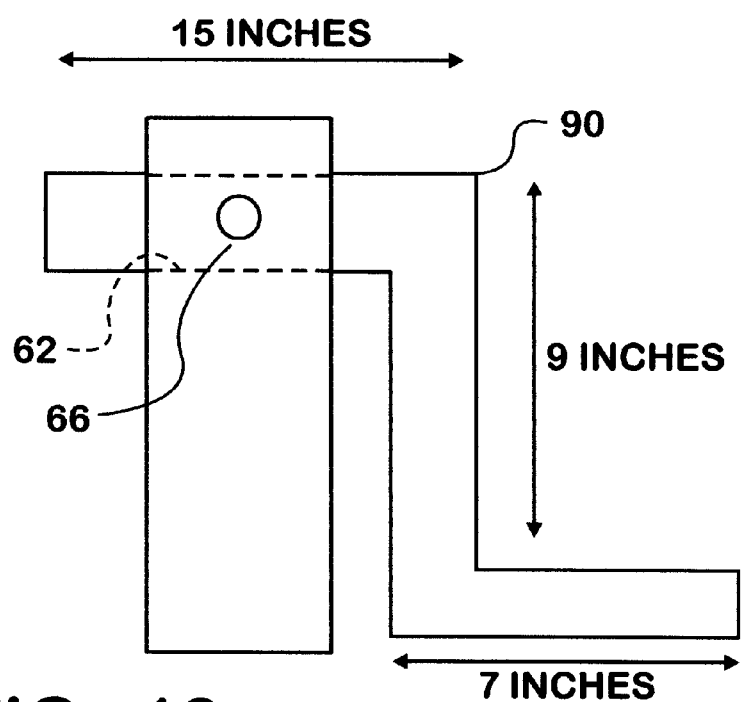
FIG. 12 is a view similar to FIG. 7 showing still another modified form.
Figure 13:
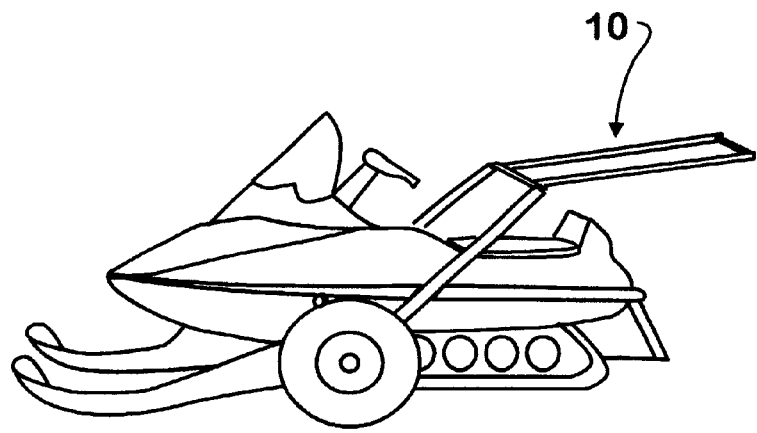
FIG. 13 is a view showing use of the modified form of FIG. 12.

FIG. 12 shows a crank handle 90 associated with lift bar 30 in substitution of shaft 60 and its disk 40. A second crank handle is symmetrically associated with lift bar 32. Crank handles 90 are useful in lifting a craft where it is necessary to engage the sides of the craft at locations which are lower to the ground. FIG. 13 shows an example where the inventive hand truck has lifted, and is carrying, a snowmobile.

For lifting the snowmobile, fasteners 66 are not tightly clamping the shafts of the crank handles that fit in the holes 62. This allows the crank handles to hang down like pendulums. The truck is manipulated to a position like that shown in FIG. 3 while the crank handles are hanging down. This allows the protruding ends at the bottoms of the crank handles to go beneath overlying surfaces of the snowmobile. The fasteners 66 are then tightened to clamp the crank handles, and then the truck is swung to a position like that shown in FIG. 2, and the tether strap is put in place, as described earlier. The protruding ends of the crank handles may include protective covers to avoid bare metal contact with the engaged surfaces of the snowmobile.

Figure 2:
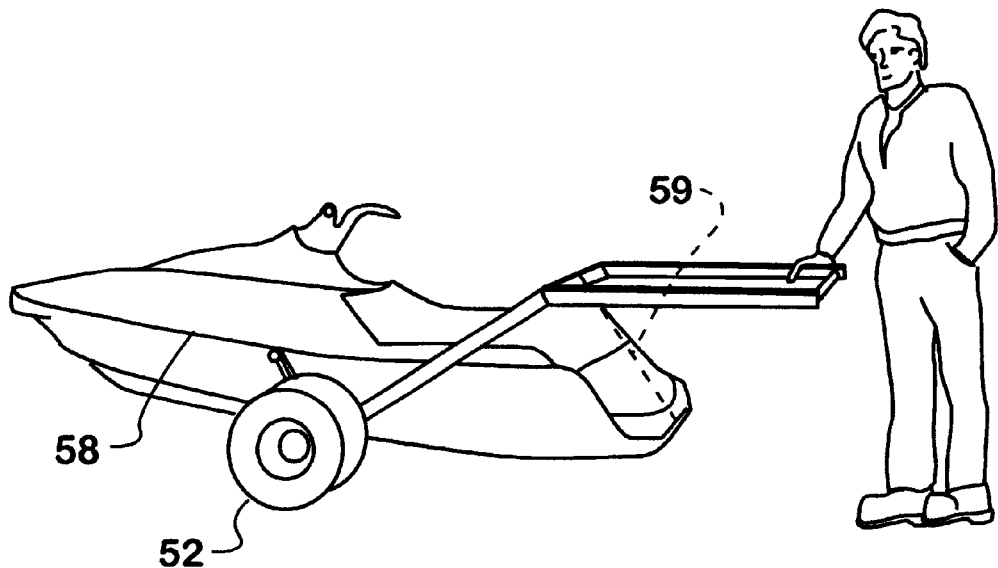
FIG. 2 is a perspective view from the right side showing the truck transporting a jet ski.

Alternately, the fasteners 66 may be tightened only after the truck has been swung to the position of FIG. 2. That will allow the crank handles to turn within holes 62 as the truck is being swung to lift the snowmobile.

Figure 14:
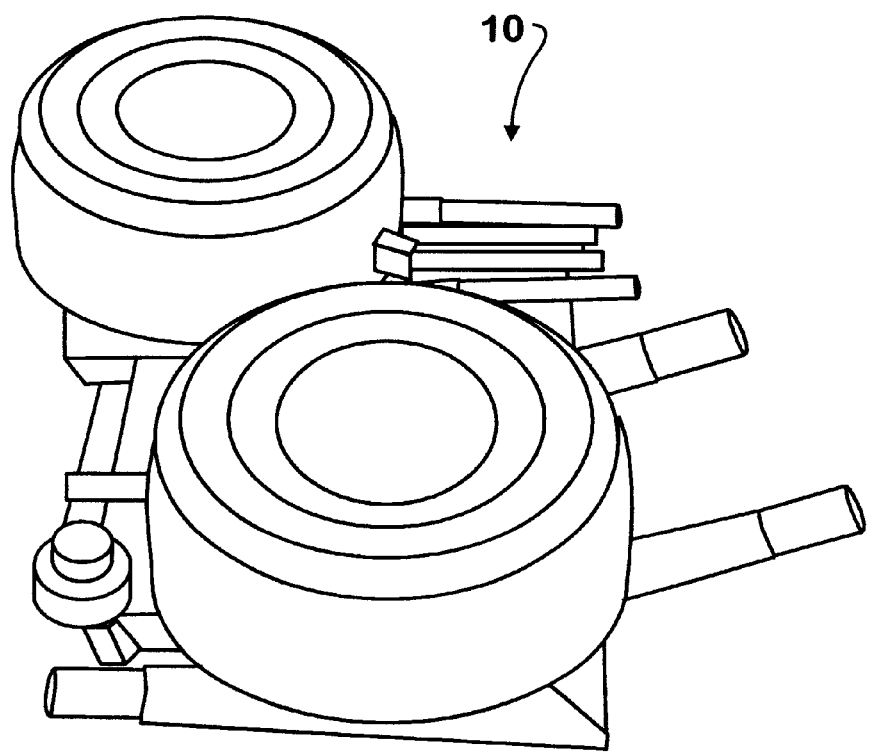
FIG. 14 is a view showing the various parts broken down for shipment.

FIG. 14 show that the various parts can be broken down and nested for convenient packaging for shipping purposes. A new truck may be shipped disassembled in a cardboard container with the parts nested as shown in FIG. 14.

While a presently preferred embodiment of the invention has been illustrated and described, it should be appreciated that principles are applicable to other embodiments.

What is claimed is:

1. A hand truck for transporting land- and water-craft comprising a frame that is open at one lengthwise end and comprises lengthwise extending sides for placement alongside a craft that is to be transported, wheels on the sides of the frame proximate the open end of the frame providing for the frame to be rolled on an underlying surface and for the frame to pivot relative to the wheels, lift bars which extend from the sides of the frame proximate the open end of the frame, including lifters for engaging a craft, to support a craft on the frame, a handle at a lengthwise end of the frame opposite the open end of the frame, the lift bars and lifters being constructed and arranged to provide a mechanical advantage for lifting a craft when the handle is forced in a generally downward direction to pivot the frame about the wheels, in which each lifter comprises a respective first member that extends in-board from a respective lift bar and a respective second member at the in-board end of the first member adapted to transmit the weight of the craft through the respective first member to the lift bar.

2. A hand truck as set forth in claim 1 in which the sides of the frame comprise straight side members and the lift bars are joined at approximately right angles to the straight side members.

3. A hand truck as set forth in claim 2 in which the handle joins to the frame at an obtuse angle to the straight side members.

4. A hand truck as set forth in claim 3 in which the frame comprises a transverse member extending transversely between the straight side members.

5. A hand truck as set forth in claim 4 in which the handle comprises a transverse handle member that is generally parallel with, and spaced lengthwise of the frame from, the transverse frame member.

6. A hand truck as set forth in claim 4 including a craft disposed for transport on frame with its center of gravity disposed lengthwise of the frame between an imaginary axis about which the wheels rotate and the handle, the craft having a lengthwise end between the transverse member and the handle, and including a tether from the transverse member to the lengthwise end of the craft.

7. A hand truck as set forth in claim 1 in which each second member comprises a disk.

8. A hand truck as set forth in claim 7 in which each disk comprises metal that is covered by a non-metallic material so that the metal of the disks does not touch a craft engaged by the lifters.

9. A hand truck as set forth in claim 1 in which the lift bars have through-holes that are transverse to the frame, and the first members comprise shafts that pass through the through-holes.

10. A hand truck as set forth in claim 9 including fasteners that fasten the shafts tight in the through-holes.

11. A hand truck for transporting land- and water-craft comprising a frame that is open at one lengthwise end and comprises lengthwise extending sides for placement alongside a craft that is to be transported, wheels on the sides of the frame proximate the open end of the frame providing for the frame to be rolled on an underlying surface and for the frame to pivot relative to the wheels, lift bars which extend from the sides of the frame proximate the open end of the frame, including lifters for engaging a craft, to support a craft on the frame, a handle at a lengthwise end of the frame opposite the open end of the frame, the lift bars and lifters being constructed and arranged to provide a mechanical advantage for lifting a craft when the handle is forced in a generally downward direction to pivot the frame about the wheels, in which the lift bars have through-holes that are transverse to the frame, and the lifters are disposed in-board of the lift bars on shafts that pass through the through-holes, and in which a spring-load mechanism resiliently biases each shaft inboard of the respective lift bar.

12. A hand truck for transporting land- and water-craft comprising a frame that is open at one lengthwise end and comprises lengthwise extending sides for placement alongside a craft that is to be transported, wheels on the sides of the frame proximate the open end of the frame providing for the frame to be rolled on an underlying surface and for the frame to pivot relative to the wheels, lift bars which extend from the sides of the frame proximate the open end of the frame, including lifters for engaging a craft, to support a craft on the frame, a handle at a lengthwise end of the frame opposite the open end of the frame, the lift bars and lifters being constructed and arranged to provide a mechanical advantage for lifting a craft when the handle is forced in a generally downward direction to pivot the frame about the wheels, in which the lift bars have through-holes that are transverse to the frame, and the lifters are disposed inboard of the lift bars on shafts that pass through the through-holes, and in which each shaft comprises a respective crank handle that can turn within the respective through-hole.

13. A hand truck as set forth in claim 12 including a respective fastener for making each crank handle fast in the respective through-hole.

14. A hand truck for transporting land- and water-craft comprising a frame that is open at one lengthwise end and comprises lengthwise extending sides for placement alongside a craft that is to be transported, wheels on the sides of the frame proximate the open end of the frame providing for the frame to be rolled on an underlying surface and for the frame to pivot relative to the wheels, lift bars which extend from the sides of the frame proximate the open end of the frame, including lifters for engaging a craft, to support a craft on the frame, a handle at a lengthwise end of the frame opposite the open end of the frame, the lift bars and lifters being constructed and arranged to provide a mechanical advantage for lifting a craft when the handle is forced in a generally downward direction to pivot the frame about the wheels, and including a telescoping connection between the sides of the frame to provide for the width of the frame to be set to a desired dimension.

15. A hand truck for transporting land- and water-craft comprising a frame that has an open throat at one lengthwise end, wheels on either side of the throat providing for the frame to be rolled on an underlying surface to insert an end of a craft into the throat and for the frame to pivot about the wheels, the frame comprising lift bars which extend from the sides of the frame proximate the open throat at one lengthwise end of the frame, including lifters for engaging the craft, to support the craft on the frame, a handle extending from the frame opposite the open throat, the frame being constructed and arranged to provide a mechanical advantage for lifting the craft via the lift bars and lifters when the handle is forced in a generally downward direction to pivot the frame about the wheels, and in which each lifter extends in-board of the respective lift bar parallel to an axis of rotation of a respective wheel.

* * * * *